(12) United States Patent
Uchimura et al.

(10) Patent No.: US 11,070,764 B2
(45) Date of Patent: Jul. 20, 2021

(54) VIDEO COMMUNICATION DEVICE, VIDEO COMMUNICATION METHOD, VIDEO PROCESSING DEVICE, AND INFORMATION PROCESSING METHOD

(71) Applicant: SONY CORPORATION, Tokyo (JP)

(72) Inventors: Kouichi Uchimura, Kanagawa (JP); Tomoaki Iwata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/977,890

(22) PCT Filed: Jan. 16, 2019

(86) PCT No.: PCT/JP2019/000996
§ 371 (c)(1),
(2) Date: Sep. 3, 2020

(87) PCT Pub. No.: WO2019/176262
PCT Pub. Date: Sep. 19, 2019

(65) Prior Publication Data
US 2021/0006745 A1  Jan. 7, 2021

(30) Foreign Application Priority Data
Mar. 12, 2018  (JP) .............................. JP2018-044638

(51) Int. Cl.
*H04N 5/232* (2006.01)
*H04N 5/765* (2006.01)
(Continued)

(52) U.S. Cl.
CPC ............. *H04N 5/765* (2013.01); *H04N 5/781* (2013.01); *H04N 21/4334* (2013.01); *H04N 21/43615* (2013.01); *H04N 21/47* (2013.01)

(58) Field of Classification Search
None
See application file for complete search history.

(56) References Cited

U.S. PATENT DOCUMENTS

2005/0286864 A1  12/2005  Saito
2008/0050098 A1   2/2008  Okamura et al.
(Continued)

FOREIGN PATENT DOCUMENTS

CN  108353199 A  7/2018
JP  2006-012095 A  1/2006
(Continued)

OTHER PUBLICATIONS

International Search Report and Written Opinion of PCT Application No. PCT/JP2019/000996, dated Apr. 9, 2019, 13 pages of ISRWO.

*Primary Examiner* — Eileen M Adams
(74) *Attorney, Agent, or Firm* — Chip Law Group

(57) ABSTRACT

The problem of the present disclosure relates to enabling smooth communication of high-image-quality video content between apparatuses. A video communication device including: a communication unit that receives, from one or more video processing devices, device information of each of the one or more video processing devices; and a determination unit that determines, on the basis of one or more pieces of device information received by the communication unit, whether or not each of the one or more video processing devices has a high image quality function, the high image quality function being a function that supports any of high image qualities of 4K or more, in which the communication unit transmits video content having the high image quality to a video processing device that has been determined by the determination unit to have the high image quality function.

13 Claims, 9 Drawing Sheets

(51) Int. Cl.
    *H04N 5/781*     (2006.01)
    *H04N 21/433*    (2011.01)
    *H04N 21/436*    (2011.01)
    *H04N 21/47*     (2011.01)

(56) References Cited

U.S. PATENT DOCUMENTS

| | | | |
|---|---|---|---|
| 2010/0313225 A1 | 12/2010 | Cholas et al. | |
| 2014/0006562 A1* | 1/2014 | Handa | H04L 67/02 709/219 |
| 2014/0115472 A1 | 4/2014 | Mochinaga et al. | |
| 2016/0057494 A1* | 2/2016 | Hwang | H04N 21/434 725/133 |
| 2016/0127686 A1* | 5/2016 | Nagase | H04N 7/15 348/14.07 |
| 2016/0173846 A1* | 6/2016 | Uchimura | H04N 9/8715 386/248 |
| 2016/0301907 A1* | 10/2016 | Uchimura | G11B 27/329 |
| 2018/0310035 A1 | 10/2018 | Kawamae et al. | |

FOREIGN PATENT DOCUMENTS

| | | |
|---|---|---|
| JP | 2008-054231 A | 3/2008 |
| JP | 2009-218844 A | 9/2009 |
| JP | 2010-011180 A | 1/2010 |
| JP | 2010-130345 A | 6/2010 |
| JP | 2012-529856 A | 11/2012 |
| JP | 2013-255250 A | 12/2013 |
| WO | 2017/138075 A1 | 8/2017 |

\* cited by examiner

VIDEO COMMUNICATION DEVICE, VIDEO COMMUNICATION METHOD, VIDEO PROCESSING DEVICE, AND INFORMATION PROCESSING METHOD

CROSS REFERENCE TO RELATED APPLICATIONS

This application is a U.S. National Phase of International Patent Application No. PCT/JP2019/000996 filed on Jan. 16, 2019, which claims priority benefit of Japanese Patent Application No. JP 2018-044638 filed in the Japan Patent Office on Mar. 12, 2018. Each of the above-referenced applications is hereby incorporated herein by reference in its entirety.

TECHNICAL FIELD

The present disclosure relates to a video communication device, a video communication method, a video processing device, and an information processing method.

BACKGROUND ART

A technology in which according to Universal Plug and Play (UPnP) standards, and Digital Living Network Alliance (DLNA) (registered trademark) guideline, in-home apparatuses are interconnected to construct a home network is attracting attention. In a home network, for example, a video communication device that receives video content is connected to a video processing device that records the video content, and the video communication device is capable of transmitting the video content to the video processing device. Such a home network is disclosed in, for example, patent document 1.

In addition, in recent years, increasing attention is being paid to broadcasting of higher-image-quality video content. As high-image-quality video content, for example, broadcasting of 4K/8K video content is scheduled.

CITATION LIST

Patent Document

Patent Document 1: Japanese Patent Application Laid-Open No. 2009-218844

SUMMARY OF THE INVENTION

Problems to be Solved by the Invention

However, at the present time, there is no defined protocol according to which high-image-quality video content such as 4K and 8K is communicated between a video communication device and a video processing device in a home network. Accordingly, even if broadcasting of high-image-quality video content is started, it is assumed that it becomes difficult to make full use of high-image-quality video content in the home network.

Accordingly, the present disclosure proposes a video communication device, a video communication method, a video processing device and an information processing method, which enable smooth communication of high-image-quality video content between apparatuses, and which are novel and improved.

Solutions to Problems

According to the present disclosure, there is provided a video communication device including: a communication unit that receives, from one or more video processing devices, device information of each of the one or more video processing devices; and a determination unit that determines, on the basis of one or more pieces of device information received by the communication unit, whether or not each of the one or more video processing devices has a high image quality function, the high image quality function being a function that supports any of high image qualities of 4K or more, in which the communication unit transmits video content having the high image quality to a video processing device that has been determined by the determination unit to have the high image quality function.

In addition, according to the present disclosure, there is provided a video communication method including: receiving, from one or more video processing devices, device information of each of the one or more video processing devices; on the basis of one or more pieces of received device information, determining, by a processor, whether or not each of the one or more video processing devices has a high image quality function, the high image quality function being a function that supports any of high image qualities of 4K or more; and transmitting video content having the high image quality to a video processing device that has been determined to have the high image quality function.

In addition, according to the present disclosure, there is provided a video processing device including: a video processing unit having a high image quality function that supports any of high image qualities of 4K or more; and a communication unit that, according to a request from a video communication device, transmits, to the video communication device, device information including information indicating the high image quality function possessed by the video processing unit, and receives video content having the high image quality from the video communication device.

In addition, according to the present disclosure, there is provided an information processing method including: receiving a request for device information from a video communication device; controlling, by a processor, transmission of the device information to the video communication device, the device information including information indicating a high image quality function that supports any of high image qualities of 4K or more; and receiving video content having the high image quality from the video communication device.

Effect of the Invention

As described above, according to the present disclosure, high-image-quality video content can be smoothly communicated between apparatuses. It should be noted that the above effect is not necessarily limitative, and along with or instead of the above effect, any effect described in the present description or other effects that can be grasped from the present description may be exhibited.

MODE FOR CARRYING OUT THE INVENTION

Figure 1:
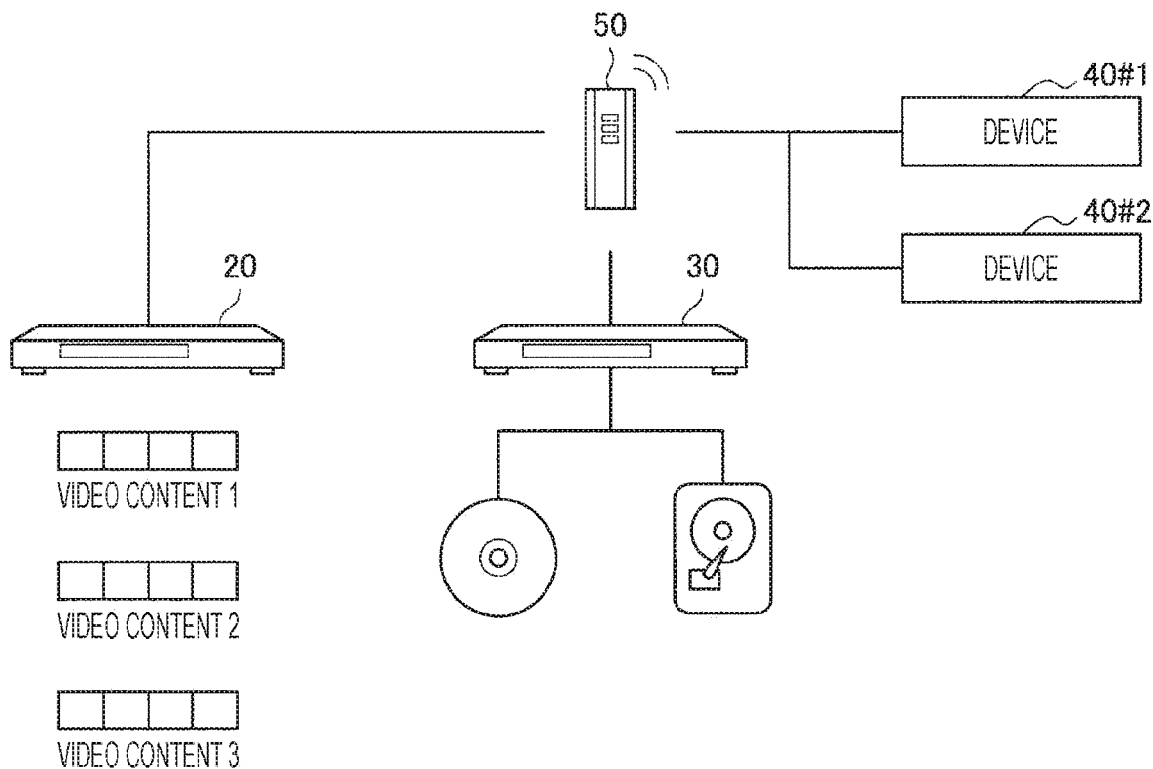
FIG. 1 is an explanatory drawing illustrating a video communication system according to an embodiment of the present disclosure.

Preferred embodiments of the present disclosure will be detailed below with reference to the accompanying drawings. It should be noted that components, described herein and on the drawings, having substantially identical functional configurations are denoted with identical reference numbers, and explanation thereof will not be repeated.

In addition, in the present description and the drawings, there is also a case where a plurality of components each having a substantially identical functional configuration is distinguished by different alphabets added to the last part of an identical reference numeral. However, in a case where it is not particularly necessary to distinguish a plurality of components each having a substantially identical functional configuration, the plurality of components is each denoted only by the identical reference numeral.

In addition, the present disclosure will be described according to the order of items shown below.

1. Outline of video communication system
2. Configuration of broadcast receiving STB
3. Configuration of recorder
4. Outline of operation
5. Selection of apparatus
6. Selection of recording medium
7. Selection of video content
8. Uploading of video content
9. Effects
10. Modified examples

1. OUTLINE OF VIDEO COMMUNICATION SYSTEM

An embodiment of the present disclosure mainly relates to a video communication system used to communicate video content between in-home devices. An outline of the video communication system according to the embodiment of the present disclosure will be described below with reference to FIG. 1.

FIG. 1 is an explanatory drawing illustrating the video communication system according to the embodiment of the present disclosure. As shown in FIG. 1, the video communication system according to the embodiment of the present disclosure includes a broadcast receiving Set Top Box (STB) 20, a recorder 30, and one or more devices 40 (in the example shown in FIG. 1, devices 40 #1 and 40 #2). The broadcast receiving STB 20, the recorder 30, and one or more devices 40 form one network by being connected to one another wiredly using a LAN or the like, or wirelessly using a WiFi or the like, through a Dynamic Host Configuration Protocol (DHCP) router 50.

(Broadcast Receiving STB)

The broadcast receiving STB 20 receives video content broadcasted by terrestrial digital broadcasting, satellite broadcasting, cable television broadcasting, IP broadcasting or the like, and converts the video content into a signal format that can be displayed on a display device. The broadcast receiving STB 20 is a video communication device that transmits received video content to other apparatuses connected to the broadcast receiving STB 20, the apparatuses including the recorder 30 and the devices 40 and the like. The broadcast receiving STB 20 may transmit video content that is being broadcasted in real time, or may transmit video content stored in a built-in storage unit. The broadcast receiving STB 20 has a high image quality function that supports a high image quality of 4K or more, and is also capable of processing a broadcast signal of high-image-quality video content.

It should be noted that the broadcast receiving STB 20 is capable of transmitting video content with the video content compressed. Accordingly, the broadcast receiving STB 20 may transmit the video content in a lower traffic and in a shorter time than required by a High-Definition Multimedia Interface (HDMI) (registered trademark) that transmits decoded content. In addition, if video content is transmitted by the broadcast receiving STB 20, additional information such as chapter information of the video content can be maintained.

(Recorder)

The recorder 30 is a video processing device that has a function of recording video content on a recording medium. The recorder 30 receives video content transmitted from, for example, the broadcast receiving STB 20, and records the received video content on a Hard Disk Drive (HDD) or on a BD (removable media) loaded into a BD drive that is an example of a media drive. The recorder 30 has a high image quality function that supports video content having a high image quality of 4K or more, and is capable of recording high-image-quality video content on a HDD.

It should be noted that there can be a BD that supports video content of 4K or more, and a BD that does not support video content of 4K or more.

(Device)

The device 40 is an apparatus that is communicably connected to the broadcast receiving STB 20. The device 40 may have a function of receiving video content transmitted from the broadcast receiving STB 20, and a function of displaying or recording the received video content.

(Background)

There is a case where a user of the broadcast receiving STB 20 wishes to record video content received by the broadcast receiving STB 20 in an apparatus in a network. In this case, the broadcast receiving STB 20 uses communication that conforms to Universal Plug and Play (UPnP) standards to search the network having apparatuses connected thereto for an apparatus having a video-content recording function, and transmits the video content to the apparatus.

However, at the present time, there is no defined protocol according to which each apparatus in the network indicates whether or not the each apparatus has a high image quality function. In other words, even if the user wishes to record high-image-quality video content, the broadcast receiving STB does not have any means for grasping whether or not each apparatus has a high image quality function, and therefore there is concern that the high-image-quality video content is not transmitted from the broadcast receiving STB to an appropriate apparatus. In addition, although video content can be recorded on a HDD that is connected to a TV, since the video content is device-bound, the video content can be reproduced only on a TV that has recorded the video content. Therefore, when the HDD reaches full capacity, the video content is deleted to provide the HDD with a free space.

Accordingly, considering the above-described circumstance as one viewpoint, embodiments of the present disclosure have been devised. According to the embodiments of the present disclosure, high-image-quality video content can be smoothly communicated between apparatuses. Configuration and operation of such embodiments of the present disclosure will be successively described in detail below.

2. CONFIGURATION OF BROADCAST RECEIVING SIB

Figure 2:
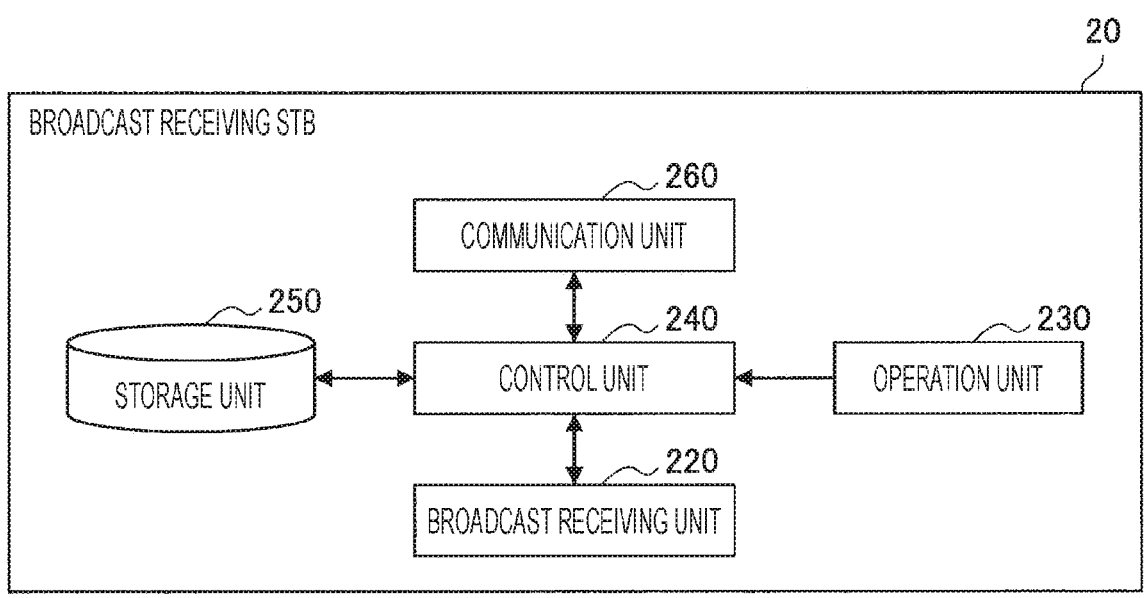
FIG. 2 is an explanatory drawing illustrating a configuration of a broadcast receiving STB 20 according to the embodiment of the present disclosure.

FIG. 2 is an explanatory drawing illustrating a configuration of the broadcast receiving STB 20 according to the embodiment of the present disclosure. As shown in FIG. 2, the broadcast receiving STB 20 according to the embodiment of the present disclosure includes a broadcast receiving unit 220, an operation unit 230, a control unit 240, a storage unit 250, and a communication unit 260.

The broadcast receiving unit 220 receives video content broadcasted by terrestrial digital broadcasting, satellite broadcasting, cable television broadcasting, IP broadcasting or the like, and converts the video content into a signal format that can be displayed on a display device.

The operation unit 230 is configured to allow a user of the broadcast receiving STB 20 to input information and an instruction into the broadcast receiving STB 20 by operation. The operation unit 230 may be a structure such as a button, a dial or a touch panel, or may be a light receiving unit that receives an operation signal from a remote controller. The operation of the operation unit 230 enables the user to perform, for example, selection of video content, selection of an apparatus that is a transmission destination of video content, selection of a recording medium that is a recording destination of video content, and the like.

The control unit 240 controls the overall operation of the broadcast receiving STB 20. For example, the control unit 240 controls communication of the communication unit 260 with other apparatuses according to UPnP. In addition, the control unit 240 also functions as a display control unit that creates a video-content selection screen, an apparatus selection screen, a recording-destination selection screen and the like, and causes a display device (not illustrated) to display each of the selection screens. Moreover, the control unit 240 also has a function as a determination unit that determines, on the basis of the undermentioned device information obtained from each of other apparatuses, whether or not the each of other apparatuses has a high image quality function.

The storage unit 250 stores information used for the operation of the broadcast receiving STB 20. In addition, the storage unit 250 stores video content received by the broadcast receiving unit 220.

The communication unit 260 is an interface with other apparatuses, and communicates various types of information with other apparatuses. For example, the communication unit 260 transmits M-Search, HTTP GET and the like to an apparatus in the network, and receives a response from the apparatus in the network, according to UPnP. The response received from the apparatus in the network by the communication unit 260 includes: device description indicating capability of the apparatus, a support function and the like; and device information such as a list of supported video functions. In addition, the communication unit 260 is also capable of transmitting high-image-quality video content to other apparatuses.

3. CONFIGURATION OF RECORDER

The configuration of the broadcast receiving STB 20 according to the embodiment of the present disclosure has been described above. Subsequently, a configuration of the recorder 30 according to the embodiment of the present disclosure will be described with reference to FIG. 3.

Figure 3:
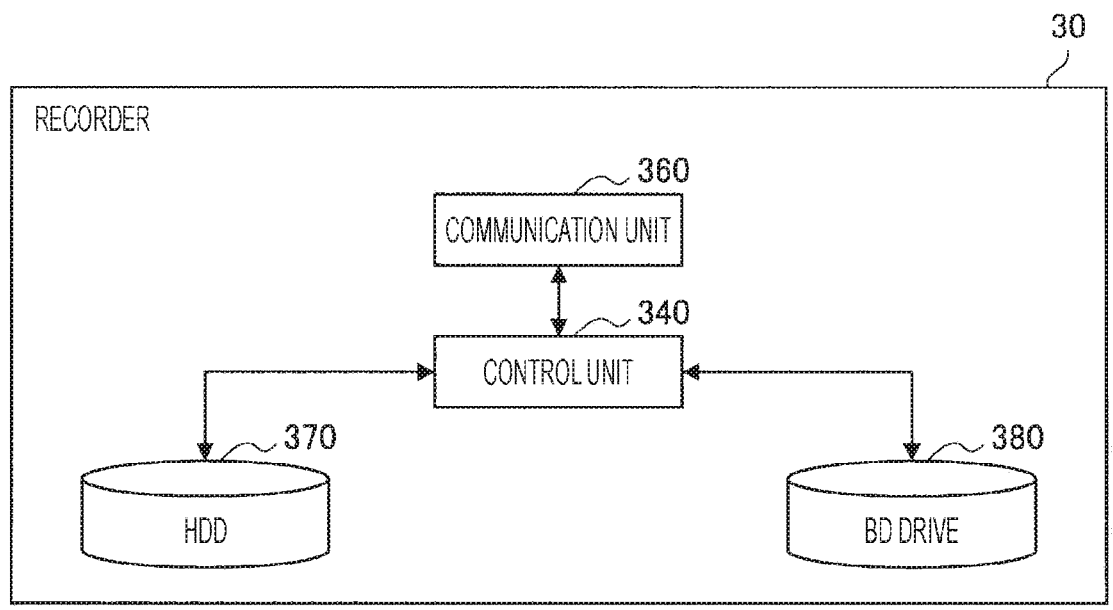
FIG. 3 is an explanatory drawing illustrating a configuration of a recorder 30 according to the embodiment of the present disclosure.

FIG. 3 is an explanatory drawing illustrating the configuration of the recorder 30 according to the embodiment of the present disclosure. As shown in FIG. 3, the recorder 30 according to the embodiment of the present disclosure includes a control unit 340, a communication unit 360, a HDD 370, and a BD drive 380.

The control unit 340 controls the overall operation of the recorder 30. For example, the control unit 340 controls communication of the communication unit 360 with other apparatuses (for example, the broadcast receiving STB 20) according to UPnP. In addition, the control unit 340 also functions as a video processing unit that controls the HDD 370 or the BD drive 380 to record the video content received by the communication unit 360.

The communication unit 360 is an interface with other apparatuses, and communicates various types of information with other apparatuses. For example, the communication unit 360 receives M-Search, HTTP GET and the like, and transmits a response to M-Search, HTTP GET and the like, according to UPnP. In addition, the communication unit 360 is also capable of receiving high-image-quality video content transmitted from the broadcast receiving STB 20.

The HDD 370 is an example of a recording medium used for the recorder 30. High-image-quality video content can be recorded on the HDD 370. The BD drive 380 has a function of recording video content on a recording medium such as a BD loaded into the BD drive 380. High-image-quality video content may be supported or unsupported by the BD drive 380.

4. OUTLINE OF OPERATION

The configurations of the broadcast receiving STB 20 and the recorder 30 according to the embodiment of the present disclosure have been described above. Subsequently, an operation outline of a video communication system according to the embodiment of the present disclosure will be described.

Figure 4:
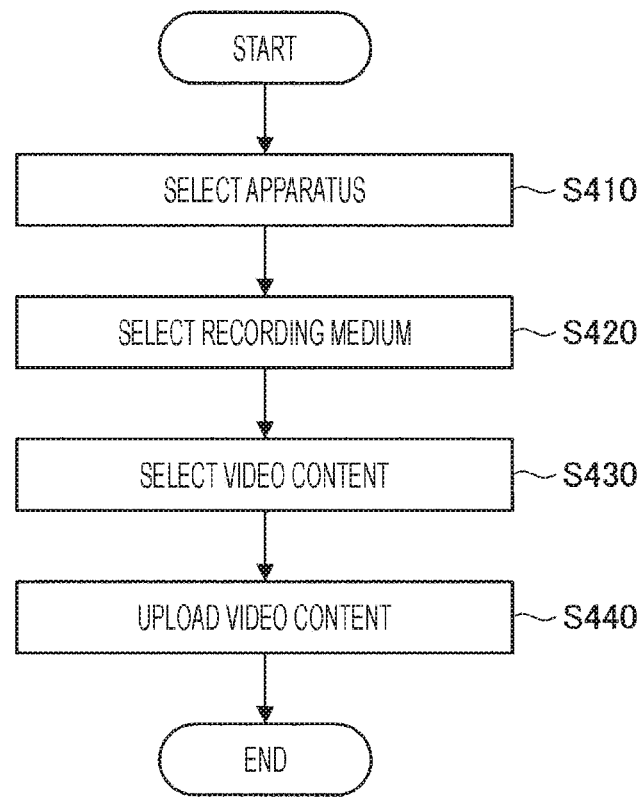
FIG. 4 is an explanatory drawing illustrating an outline of operation of the video communication system according to the embodiment of the present disclosure.

FIG. 4 is an explanatory drawing illustrating the operation outline of the video communication system according to the embodiment of the present disclosure. As shown in FIG. 4, in the video communication system, processing performed first is processing of selecting an apparatus that is a transmission destination of video content (S410).

Processing performed next is processing of selecting, in the selected apparatus, a recording medium on which video content is recorded (S420).

After that, when video content that is a transmission target is selected (S430), the video content is uploaded (transmitted) (S440).

Incidentally, the example in which after the apparatus and the recording medium are selected, the video content is selected has been described above. However, after the video content is selected, the apparatus and the recording medium may be selected.

Here, medium profiles of video content are arranged. The following 19 kinds of medium profiles are assumed as medium profiles of video content. It should be noted that representation of the following medium profiles conforms to Vcodec/System/VResolution/Audio/Subtitle.

–2K
(1) MPEG2-TS/HEVC/MPEG2 AAC
–4K (+HDR)
(2) MPEG2-TS/HEVC/SDR/MPEG2 AAC
(3) MPEG2-TS/HEVC/HLG/MPEG2 AAC
(4) MPEG2-TS/HEVC/SDR/MPEG4 AAC
(5) MMT, TLV/HEVC/SDR/MPEG4AAC
(6) MPEG2-TS/HEVC/SDR/MPEG4 ALS
(7) MMT, TLV/HEVC/SDR/MPEG 4ALS
(8) MPEG2-TS/HEVC/HLG/MPEG4 AAC
(9) MMT, TLV/HEVC/HLG/MPEG4AAC
(10) MPEG2-TS/HEVC/HLG/MPEG4 ALS
(11) MMT, TLV/HEVC/HLG/MPEG4 ALS
–8K (+HDR)
(12) MPEG2-TS/HEVC/SDR/MPEG4 AAC
(13) MMT, TLV/HEVC/SDR/MPEG4AAC
(14) MPEG2-TS/HEVC/SDR/MPEG4 ALS
(15) MMT, TLV/HEVC/SDR/MPEG4 ALS
(16) MPEG2-TS/HEVC/HLG/MPEG4 AAC
(17) MMT, TLV/HEVC/HLG/MPEG4AAC
(18) MPEG2-TS/HEVC/HLG/MPEG4 ALS
(19) MMT, TLV/HEVC/HLG/MPEG4 ALS

The above-described 19 kinds of medium profiles can be defined, for example, as follows.

1. HEVC_TS_HD_M2AAC
2. HEVC_TS_4K_SDR_M2AAC
3. HEVC_TS_4K_HLG_M2AAC
4. HEVC_TS_4K_SDR_M4AAC
5. HEVC_MMTTLV_4K_SDR_M4AAC
6. HEVC_TS_4K_SDR_M4ALS
7. HEVC_MMTTLV_4K_SDR_M4ALS
8. HEVC_TS_4K_HLG_M4AAC
9. HEVC_MMTTLV_4K_HLG_M4AAC
10. HEVC_TS_4K_HLG_M4ALS
11. HEVC_MMTTLV_4K_HLG_M4ALS
12. HEVC_TS_8K_SDR_M4AAC
13. HEVC_MMTTLV_8K_SDR_M4AAC
14. HEVC_TS_8K_SDR_M4ALS
15. HEVC_MMTTLV_8K_SDR_M4ALS
16. HEVC_TS_8K_HLG_M4AAC
17. HEVC_MMTTLV_8K_HLG_M4AAC
18. HEVC_TS_8K_HLG_M4ALS
19. HEVC_MMTTLV_8K_HLG_M4ALS

Moreover, a device profile to which two or more medium profiles belong can also be defined. For example, "REC2.0 SRVER2.0" may be defined as a device profile to which "1" to "11" that are medium profiles supporting image quality of 4K or less belong, and "REC3.0 SRVER3.0" may be defined as a device profile to which "1" to "19" that are medium profiles supporting image quality of 8K or less belong.

Operation of selecting an apparatus, operation of selecting a recording medium, operation of selecting video content, and operation of uploading video content will be successively described in detail below.

5. SELECTION OF APPARATUS

With respect to the selection of an apparatus, an apparatus that is a transmission destination of video content transmitted from the broadcast receiving STB 20 is selected.

Figure 5:
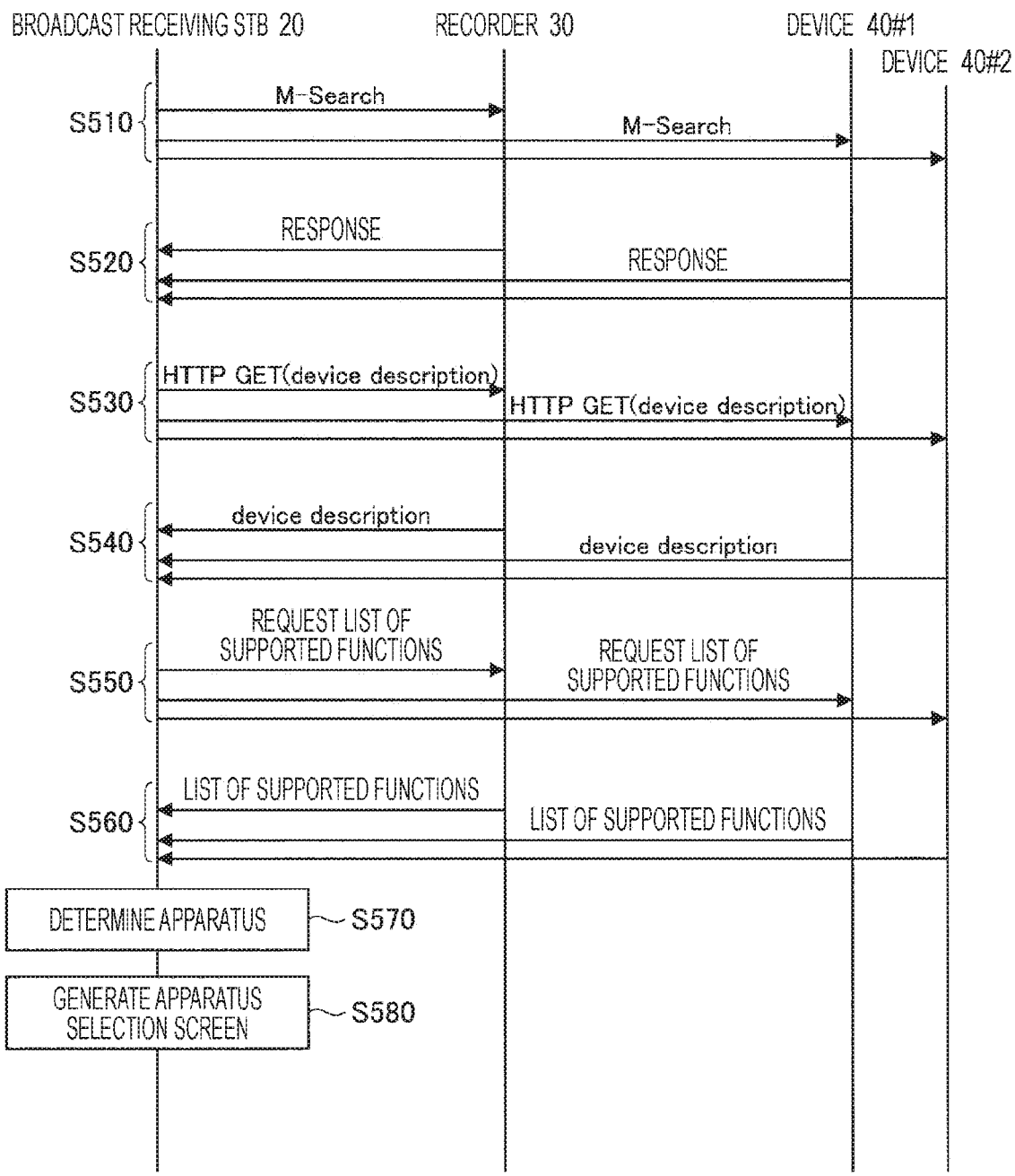
FIG. 5 is an explanatory drawing illustrating detailed operation of selecting an apparatus.

FIG. 5 is an explanatory drawing illustrating detailed operation of selecting an apparatus. As shown in FIG. 5, the broadcast receiving STB 20 multicasts M-Search to the recorder 30, the devices 40 #1 and 40 #2, all of which are apparatuses in the network (S510). The M-Search is a message used to detect an apparatus in the network. A specific example of the M-Search is as shown below.

M-SEARCH
* HTTP/1.1
HOST:239.255.255.250:1900
ST:urn:schemas-upnp-org:device:MediaServer:1
MAN:"ssdp:discover"
MX:2

After that, each apparatus that has received the M-Search transmits a response to the M-Search to the broadcast receiving STB 20 (S520). The response to the M-Search includes an URL of each apparatus. A specific example of the response to the M-Search received from the recorder 30 is as shown below. An underlined part shown below corresponds to an URL of the recorder 30.

NOTIFY*HTTP/1.1
HOST:239.255.255.250:1900
CACHE-CONTROL:max-age=300
LOCATION:http://169.254.226.30:64220/description.xml
NTS:ssdp:alive
SERVER:Sony-BDZ/1.0
Date:Mon,30 Jun. 2014 06:47:29 GMT
NT:upnp:rootdevice
USN:uuid:1958564F-B0B6-1FB3-8380-5453ed97f325::upnp:rootdevice Subsequently, in order to obtain device description from each apparatus, the broadcast receiving STB 20 designates an URL of each apparatus included in the response to the M-Search, and transmits HTTP GET (S530). For example, HTTP GET transmitted to the recorder 30 is, for example, "HTTP GET 169.254.226.30:64220/description.xml."

After that, each apparatus that has received HTTP GET transmits device description to the recorder 30 (S540). A specific example of device description transmitted from the recorder 30 is as shown below. It should be noted that in the following device description, <specVersion> indicates a version of UPnP supported by the recorder 30; <deviceType> indicates capability of the recorder 30 as an UPnP device; <hdlnk:X_HDLNKDOC> to <jlabs:X_JLAB-SCAP> indicate capability of the recorder 30 as HDRL-SPRL/JLAB; <friendlyName> to <iconList> indicate explanations of the recorder 30 when presenting to a user; and <serviceList> indicates an UPnP function supported by the recorder 30.

<root xmlns="urn:schemas-upnp-org:device-1-0"
xmlns:dlna="urn:schemas-dlna-org:device-1-0"
xmlns:sptv="urn:schemas-skyperfectv-co-jp:device-1-0"
xmlns:hdlnk="urn:schemas-hdlnk-org:device-1-0"xmlns:jlabs="urn:schemas-jlabs-or-jp:device-1-0">
  <specVersion>
    <major>1</major><minor>0</minor>
  </specVersion>
  <device>
    <deviceType>urn:schemas-upnp-org:device:MediaServer:1</deviceType>

```
<hdlnk:X_HDLNKDOC>REC-1.00</hdlnk:X_HDLNKDOC>
<sptv:X_SPTVCAP>
    REC-1.00,X_SRS-1.00,NEXT_READY-60,MOVE_RES-1.00,
    MOVE-1.00,NEXT_MOVE_COPY-60
</sptv:X_SPTVCAP>
<jlabs:X_JLABSDOC>SERVER-1.0</jlabs:X_JLABSDOC>
<jlabs:X_JLABSCAP>
    serve-1.0,upload_rec_sink-1.0,margin_rec-1.
    0-60,upload_dub_sink-1.0,margin_move-1.0-60
</jlabs:X_JLABSCAP>
<friendlyName>BDZ</friendlyName>
<manufacturer>Sony</manufacturer>
<manufacturerURL>http://www.sony.net/</manufacturerURL>
<modelDescription>BDZ1</modelDescription>
<modelName>Sony-BDZ</modelName>
<modelURL/>
<UDN>uuid:1958564F-B0B6-1FB3-8380-3c0771ab608d</UDN>
<dlna:X_DLNADOC>DMS-1.50</dlna:X_DLNADOC>
<iconList>
    <icon>
        <mimetype>image/png</mimetype><width>48</width><height>
        48</height><depth>24</depth><url>icon-0.png</url>
    </icon>
</iconList>
<serviceList>
    <service>
        <serviceType>urn:schemas-upnp-org:service
        :ContentDirectory:1</serviceType>
        <serviceId>urn:upnp-org:serviceId
        :ContentDirectory</serviceId>
        <SCPDURL>/DMSContentDirectory.xml</SCPDURL>
        <controlURL>/DMSContentDirectory</controlURL>
        <eventSubURL>/DMSContentDirectory</eventSubURL>
    </service>
    <service>
        <serviceType>urn:schemas-upnp-org:service
        :ConnectionManager:1</serviceType>
        <serviceId>urn:upnp-org:serviceId:
        ConnectionManager</serviceId>
        <SCPDURL>/CMS.xml</SCPDURL>
        <controlURL>/CMS</controlURL>
        <eventSubURL>/CMS</eventSubURL>
    </service>
    </serviceList>
    </device>
</root>
```

Subsequently, the broadcast receiving STB 20 transmits a request for a list of video functions supported by each apparatus to each apparatus (S550). A specific example of the request to the recorder 30 is as shown below.

```
POST/CMS HTTP/1.1
HOST: 43.2.73.158:64220
SOAPACTION:"urn:schemas-upnp-
org:service:ConnectionManager:1#GetProtocolInfo"
CONTENT-TYPE:text/xml;charset="utf-8"
Content-Length:294
<?xml version="1.0" encoding="utf-8"?>
<s:Envelopes:encodingStyle="http://schemas.xmlsoap.org/soap/enco
ding/"xmlns:s="http://schemas.xmlsoap.org/soap/envelope/">
    <s:Body>
        <u:GetProtocolInfo xmlns:u="urn:schemas-upnp-
org:service:Connection
        Manager:1"/>
    </s:Body>
</s:Envelope>
```

After that, each apparatus that has received the request for the list of supported video functions transmits the list of supported video functions to the recorder 30 (S560). For example, a specific example of a list of video functions transmitted to the broadcast receiving STB 20 by the recorder 30 is as shown below. In the following example, as indicated by underlined parts, video functions supported by the recorder 30 include HEVC_TS_HD_M2AAC, HEVC_TS_4K_SDR_M2AAC, and HEVC_TS_4K_HLG_M2AAC. The list enables the broadcast receiving STB 20 to understand that the recorder 30 has a high image quality function.

```
<?xml
version="1.0"?>
<s:Envelope xmlns:s=http://schemas.xmlsoap.org/soap/envelope/
s:encodingStyle
="http://schemas.xmlsoap.org/soap/encoding/">
<s:Body>
<u:GetProtocolInfoResponse xmlns:u="urn:schemas-upnp-
org:service:Connection
Manager:1">
<Source>
http-get:*:video/vnd.dlna.mpeg-tts:XXXX.XXX_PN=HEVC_TS_HD_M2AAC
;DLNA.ORG_OP=10;DLNA.ORG_CI=1;DLNA.ORG_FLAGS=0110000000000000000
0000000000000</Source>
<Source>http-get:*:video/vnd.dlna.mpeg-
tts:XXXX.XXX_PN=HEVC_TS_4K_SDR_M2AAC;
DLNA.ORG_OP=10;DLNA.ORG_CI=1;DLNA.ORG_FLAGS=01100000000000000000
000000000000</Source>
<Source>http-get:*:video/vnd.dlna.mpeg-
tts:XXXX.XXX_PN=HEVC_TS_4K_HLG_M2AAC;DLNA.ORG_OP=10:DLNA,ORG_CI=
1;DLNA.ORG_FLAGS=011000000000000000000000000000</Source>
<Sink></Sink></u:GetProtocolInfoResponse></s:Body></s:Envelope>
```

Subsequently, on the basis of the list of video functions received by each apparatus, the control unit 240 of the broadcast receiving STB 20 determines whether or not the each apparatus has a high image quality function (S570).

Then, on the basis of a result of the determination whether or not the each apparatus has a high image quality function, the control unit 240 of the broadcast receiving STB 20 generates a selection screen for selecting an apparatus to be a transmission destination of video content (S580). Here, a specific example of the selection screen will be described with reference to FIG. 6.

Figure 6:
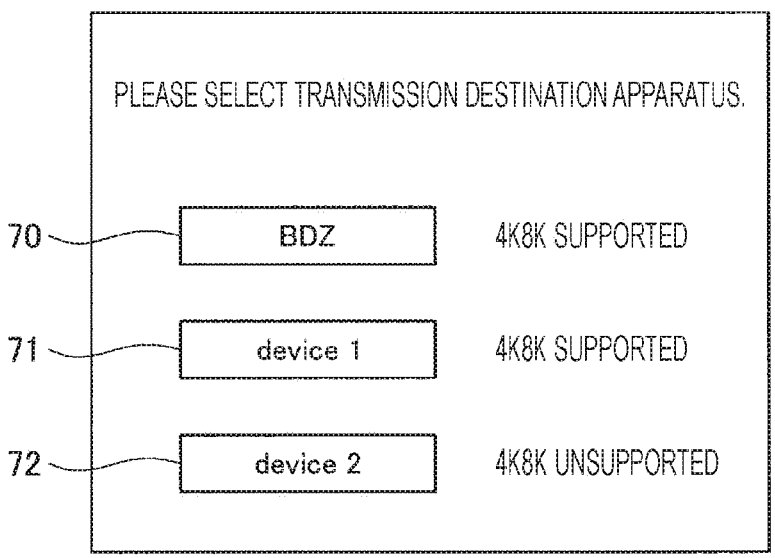
FIG. 6 is an explanatory drawing illustrating a specific example of an apparatus selection screen.

FIG. 6 is an explanatory drawing illustrating a specific example of an apparatus selection screen. The apparatus selection screen shown in FIG. 6 includes a selection button 70 indicating the recorder 30, a selection button 71 indicating a device 40 #1, and a selection button 72 indicating a device 40 #2. In addition, the apparatus selection screen includes displaying whether or not each apparatus supports 4K8K. In the example shown in FIG. 6, the selection button 70 indicating the recorder 30 and the selection button 71 indicating the device 40 #1 are each provided with a message saying "4K8K supported," and the message indicates that the recorder 30 and the device 40 #1 each have a high image quality function.

On such an apparatus selection screen, a user is enabled to grasp whether or not each apparatus has a high image quality function, and consequently to select a transmission-destination apparatus as appropriate. For example, in a case where the user intends to transmit high-image-quality video content, the user can select the recorder 30 or the device 40 #1 as a transmission destination.

Figure 7:
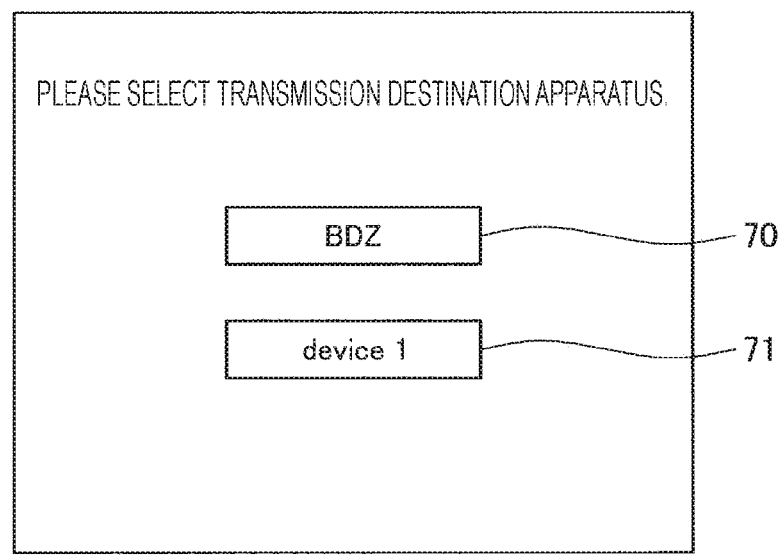
FIG. 7 is an explanatory drawing illustrating a modified example of the apparatus selection screen.

FIG. 7 is an explanatory drawing illustrating a modified example of the apparatus selection screen. In a state in which video content as a transmission target is already selected before an apparatus is selected, in a case where the video content is high-image-quality video content, the apparatus selection screen selectably displays apparatuses each having a high image quality function. However, an apparatus that does not have a high image quality function may be excluded from apparatuses that are selectably displayed on the apparatus selection screen. In the example shown in FIG. 7, while the apparatus selection screen includes the selection buttons 70 and 71 that indicate the recorder 30 and the device 40 #1 each having a high image quality function, respectively, the apparatus selection screen does not include a selection button indicating the device 40 #2 that does not have a high image quality function. Such a configuration enables the user to easily select a transmission-destination apparatus from among fewer options.

Figure 8:
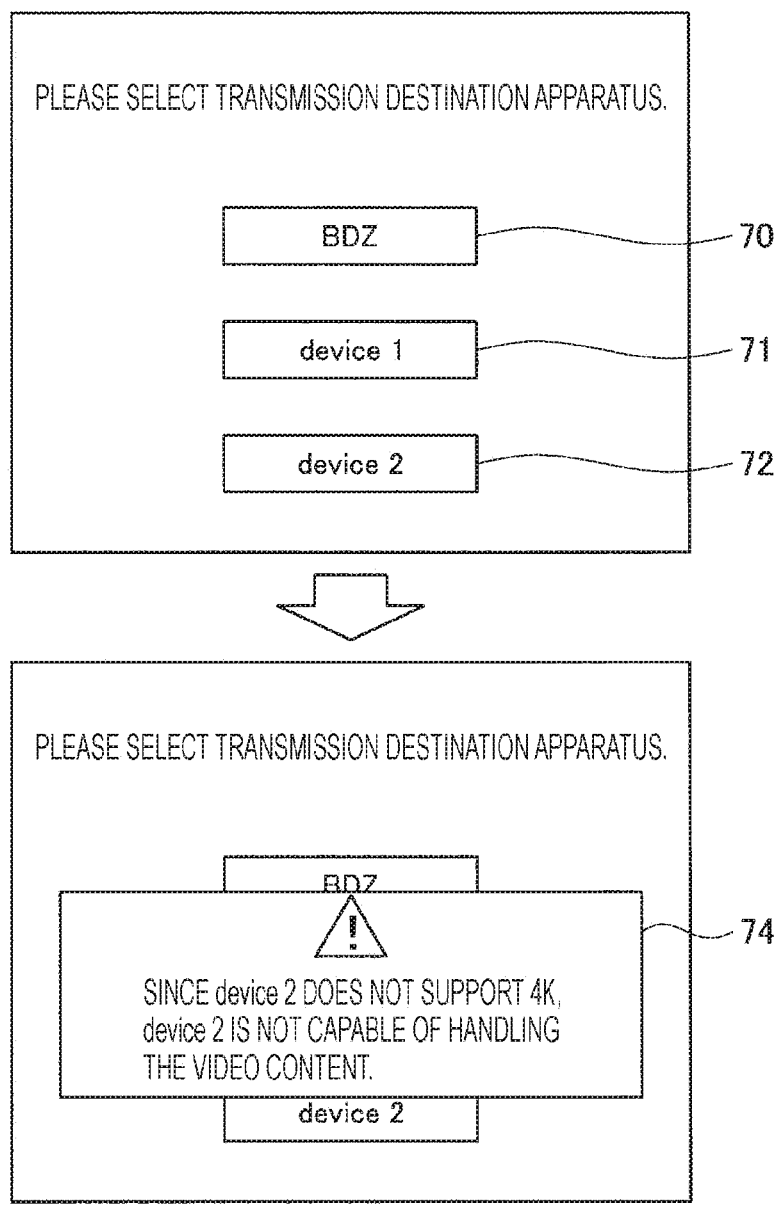
FIG. 8 is an explanatory drawing illustrating a further modified example of the apparatus selection screen.

FIG. 8 is an explanatory drawing illustrating a further modified example of the apparatus selection screen. In a state in which video content as a transmission target is already selected before an apparatus is selected, even in a case where the video content is high-image-quality video content, as shown in the upper part of FIG. 8, the selection screen may display all apparatuses in the network. However, in a case where the user has selected the selection button 72 indicating the device 40 #2 that does not support a high image quality function, as shown in the lower part of FIG. 8, the control unit 240 may display, on the selection screen, a message 74 indicating that the device 40 #2 is not capable of handling processing of high-image-quality video content. Such a configuration enables the user to understand that the device 40 #2 does not have a high image quality function, and consequently enables the user to select another apparatus as a transmission destination.

Incidentally, the example in which on the basis of the list of video functions supported by each apparatus, the control unit 240 determines whether or not each apparatus has a high image quality function has been described above. However, the embodiments of the present disclosure are not limited to such an example. For example, each apparatus may include the above-described device profile in device description. In this case, on the basis of the device description, the control unit 240 is capable of determining whether or not each apparatus has a high image quality function. A specific example of <hdlnk:X_HDLNKDOC> to <jlabs:X_JLAB-SCAP> of device description according to the modified example is as shown below. Underlined parts shown below are device profiles, and each indicate that an apparatus supports a high image quality function.

```
<hdlnk:X_HDLNKDOC>REC-1.00</hdlnk:X_HDLNKDOC>
<sptv:X_SPTVCAP>
    REC-1.00, REC-2.00,X_SRS-1.00,NEXT_READY-60,MOVE_RES-
    1.00,MOVE-1.00,NEXT_MOVE_COPY-60
</sptv:X_SPTVCAP>
<jlabs:X_JLABSDOC>
SERVER-1.0, SERVER2.0</jlabs:X_JLABSDOC>
<jlabs:X_JLABSCAP>
    serve-1.0, serve-2.0,upload_rec_sink-1.0,margin_rec-1.
    0-60,upload_dub_sink-1.0,margin_move-1.0-60
</jlabs:X_JLABSCAP>
```

In a case where the device description makes it possible to determine whether or not each apparatus has a high image quality function, the broadcast receiving STB 20 is not required to make a request to each apparatus for a list of video functions. Such a configuration enables to simplify and shorten a process of selecting an apparatus. However, even if an apparatus supports a part of medium profiles belonging to a device profile, if the apparatus does not support the other medium profiles, it is also assumed that a device profile supporting a high image quality function is not described in the device description. Accordingly, the broadcast receiving STB 20 may obtain not only the device description, but also a list of video functions supported by each apparatus.

6. SELECTION OF RECORDING MEDIUM

The operation of selecting an apparatus has been described above. Subsequently, operation of selecting a recording medium will be described. Here, it is assumed that the recorder 30 has been selected at the time of apparatus selection.

Figure 9:
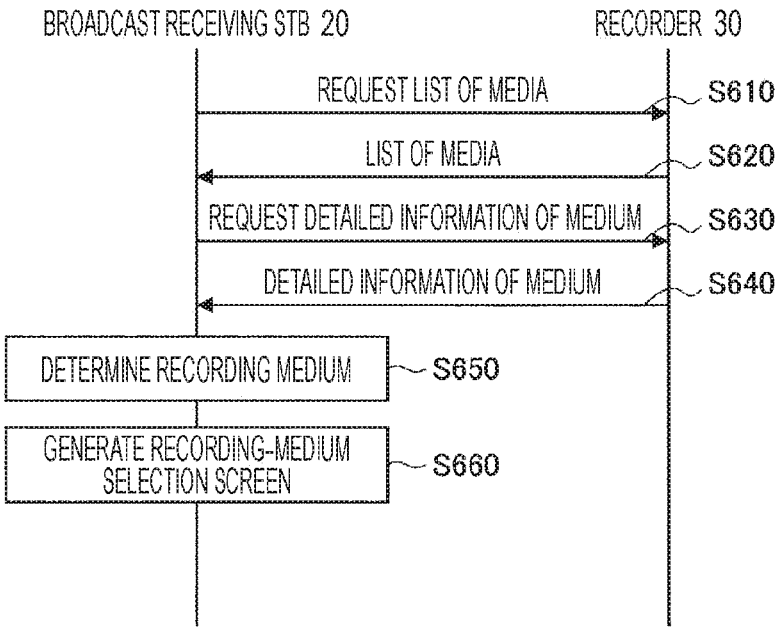
FIG. 9 is an explanatory drawing illustrating detailed operation of selecting a recording medium.

FIG. 9 is an explanatory drawing illustrating detailed operation of selecting a recording medium. As shown in FIG. 9, the broadcast receiving STB 20 transmits, to the recorder 30, a request for a list of recording media supported by the recorder (S610). A specific example of the request is as shown below. Underlined parts shown below correspond to the request for the list of recording media that are mainly supported by the recorder 30.

```
POST/upnp/control/ContentDirectory HTTP/1.1
Host:192.168.2.2:64321
User-Agent:UPnP/1.0
DLNADOC/1.50
Content-Length:298
Content-Type:text/xml;charset="utf-8"
SOAPACTION:"urn:schemas-upnp-
org:service:ContentDirectory:1#X__HDLnkGet
RecordDestinations"
<?xml version="1.0"?>
<s:Envelope
xmlns:s="http://schemas.xmlsoap.org/soap/envelope/"s:encodingSty
le="http://schemas.xmlsoap.org/soap/encoding/">
    <s:Body>
        <u:X__HDLnkGetRecordDestinations xmlns:u="urn:schemas-upnp-
org:service
:ContentDirectory:1">
        </u:X__HDLnkGetRecordDestinations>
    </s:Body>
</s:Envelope>
```

Subsequently, when the recorder 30 receives the request for the list of recording media, the recorder 30 transmits the list of recording media to the broadcast receiving STB 20 (S620). A specific example of the list of recording media is as shown below. In the following example, the underlined parts indicate that the recorder 30 supports "bd1.cache" and "hdd1" as recording media.

```
<?xml version="1.0"?>
<s:Envelop
xmlns:s="http://schemas.xmlsoap.org/soap/envelope/"s:encodingSty
le
="http://schemas.xmlsoap.org/soap/encoding/">
    <s:Body>
        <u:X__HDLnkGetRecordDestinationsResponse
        xmlns:u="urn:schemas-
upnp-org
        :service:ContentDirectory:1">
            <RecordDestinationList>
                <?xmlversion="1.0"encoding="UTF-
8"?><
                ;RecordDestinations
                xmlns="urn:schemas-hdlnk-org"><
                RecordDestination destID="bd1.cache"
                version="1"
                updateID="1">ISIS
BD</RecordDestination><
                RecordDestination
destID="hdd1"version="1"
                updateID="1">ISIS
hdd</RecordDestination>
                ;</RecordDestinations>
            </RecordDestinationList>
        </u:X__HDLnkGetRecordDestinationsResponse>
    </s:Body>
</s:Envelope>
```

After that, the broadcast receiving STB 20 transmits, to the recorder 30, a request for detailed information of each recording medium (S630). A specific example of the request is as shown below. In the following example, an underlined part corresponds to the request for detailed information of "bd1.cache."

```
POST/upnp/control/ContentDirectory HTTP/1.1
Host:192.168.2.2:64321
User-Agent:UPnP/1.0
DLNADOC/1.50
Content-Length:356
Content-Type:text/xml;
charset="utf-8"
```

```
SOAPACTION:"urn:schemas-upnp-
org:service:ContentDirectory:1#X__HDLnkGetRecord
DestinationInfo"
<?xml
version="1.0"?>
<s:Envelopexmlns:s="http://schemas.xmlsoap.org/soap/envelope/"s:
encodingStyle
="http://schemas.xmlsoap.org/soap/encoding/">
    <s:Body>
        <u:X__HDLnkGetRecordDestinationInfoxmlns:u="urn:schemas-upnp-
org:service
:ContentDirectory:1">
            <RecordDestinationID>bd1.cache</RecordDestinationID>
        </u:X__HDLnkGetRecordDestinationInfo>
    </s:Body>
</s:Envelope>
```

Subsequently, the recorder 30 transmits the detailed information of "bd1.cache" to the broadcast receiving STB 20 according to the request from the broadcast receiving STB 20 (S640). A specific example of the detailed information of "bd1.cache" is as shown below. Underlined parts shown below indicate that video content can be recorded on a BD8K by "bd1.cache," and the BD8K is loaded into "bd1.cache."

In other words, in the embodiment of the present disclosure, information indicating whether or not a recording medium supports a high image quality function is added to allowedTypes. It should be noted that although explanation is omitted here, processing of S630 and processing of S640 are also executed for "hdd1."

```
<?xml
version="1.0"?>
<s:Envelope
xmlns:s="http://schemas.xmlsoap.org/soap/envelope/"s:encodingSty
le
="http://schemas.xmlsoap.org/soap/encoding/">
    <s:Body>
        <u:X__HDLnkGetRecordDestinationInfoResponse
xmlns:u="urn:schemas-upnp-org
        :service:ContentDirectory:1">
            <RecordDestinationInfo><?xml version="1.0"
encoding
            ="UTF-8"?><RecordDestinationInfo
xmlns="urn:schemas-
                hdlnk-org" version="1" allowedTypes
                ="BD, BD8K,NONE" recordable="1"
dtcpSupport
```

-continued

```
        ="1" totalCapacity="0"
availableCapacity
        ="0"> BD8K</RecordDestinationInfo>
        </RecordDestinationInfo>
    </u:X_HDLnkGetRecordDestinationInfoResponse>
  </s:Body>
</s:Envelope>
```

After that, on the basis of the detailed information of each recording medium, the detailed information having been received from the recorder 30, the broadcast receiving STB 20 determines whether or not each recording medium supports a high-image-quality video content (S650).

Then, on the basis of a result of determination whether or not each recording medium supports a high-image-quality video content, the broadcast receiving STB 20 generates a selection screen for selecting a recording medium that is a recording destination of video content (S660). Here, a specific example of the selection screen will be described with reference to FIG. 10.

Figure 10:
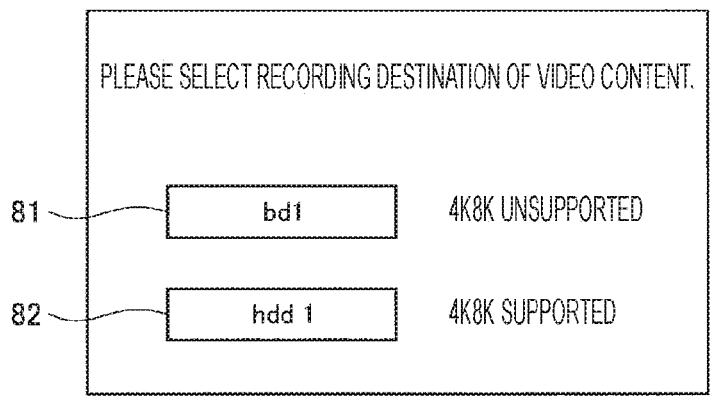
FIG. 10 is an explanatory drawing illustrating a specific example of a recording-medium selection screen.

FIG. 10 is an explanatory drawing illustrating a specific example of a recording-medium selection screen. An apparatus selection screen shown in FIG. 10 includes a selection button 81 indicating the BD drive 380, and a selection button 82 indicating the HDD 370. In addition, the recording-medium selection screen includes displaying whether or not each recording medium supports 4K8K. In the example shown in FIG. 10, the selection button 82 indicating the HDD 370 is provided with a message saying "4K8K supported," and the message indicates that high-image-quality video content can be recorded on the HDD 370. Meanwhile, the selection button 81 indicating the BD drive 380 is provided with a message saying "4K8K unsupported," and the message indicates that the BD drive 380 does not support high-image-quality video content.

On such a recording-medium selection screen, the user is enabled to grasp whether or not each recording medium supports high-image-quality video content, and consequently to select a recording-destination recording medium as appropriate. For example, in a case where the user intends to transmit high-image-quality video content, the user can select the HDD 370 as a recording destination.

Figure 11:
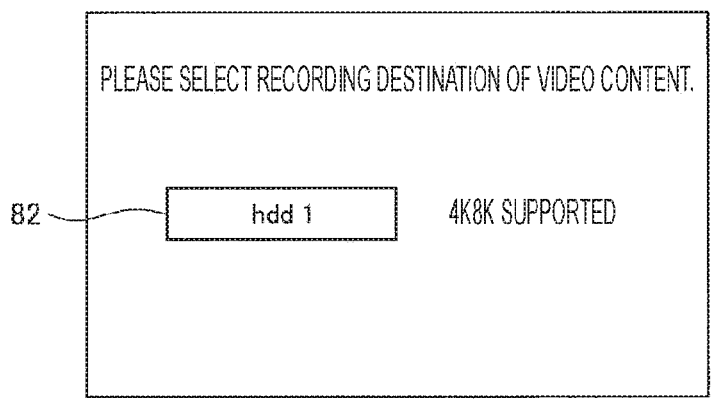
FIG. 11 is an explanatory drawing illustrating a modified example of the recording-medium selection screen.

FIG. 11 is an explanatory drawing illustrating a modified example of the recording-medium selection screen. In a state in which video content as a transmission target is already selected before a recording medium is selected, in a case where the video content is high-image-quality video content, the recording-medium selection screen selectably displays recording media each supporting a high image quality function. However, a recording medium that does not support a high image quality function may be excluded from recording media that are selectably displayed on the recording-medium selection screen. In the example shown in FIG. 11, while the recording-medium selection screen includes the selection button 82 indicating the HDD 370 having a high image quality function, the recording-medium selection screen does not include the selection button indicating the BD drive 380 that does not have a high image quality function. Such a configuration enables the user to easily select a recording-destination recording medium from among fewer options.

Figure 12:
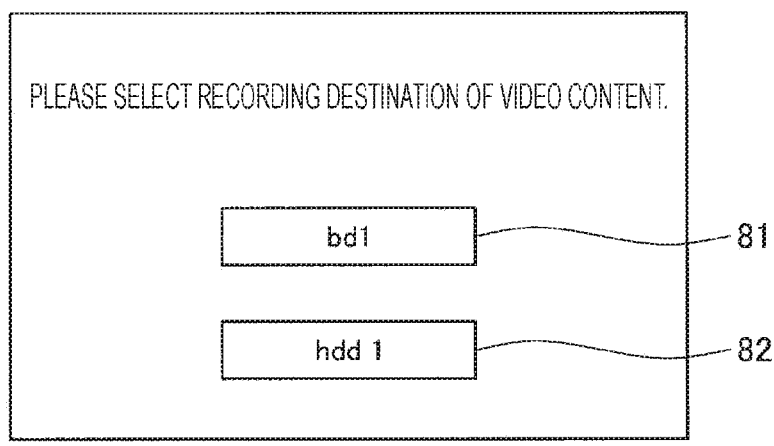
FIG. 12 is an explanatory drawing illustrating another modified example of the recording-medium selection screen.
Figure 12:
Figure 12:
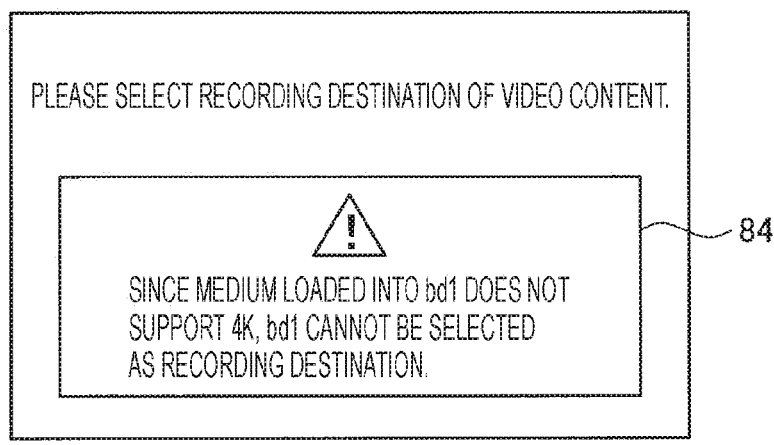

FIG. 12 is an explanatory drawing illustrating another modified example of the recording-medium selection screen. In a state in which video content as a transmission target is already selected before a recording medium is selected, even in a case where the video content is high-image-quality video content, as shown in the upper part of FIG. 12, the selection screen may include all recording media included in the transmission destination apparatus. However, in a case where the user has selected the selection button 81 indicating the BD drive 380 that does not support a high image quality function, as shown in the lower part of FIG. 12, the control unit 240 may display, on the selection screen, a message 84 indicating that the BD drive 380 is not capable of handling processing of high-image-quality video content. Such a configuration enables the user to understand that the BD drive 380 does not support high-image-quality video content, and to select another recording medium as a recording destination.

Figure 13:
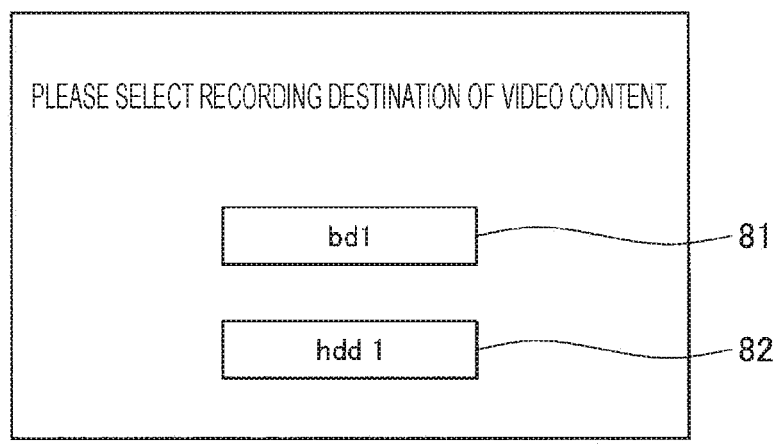
FIG. 13 is an explanatory drawing illustrating still another modified example of the recording-medium selection screen.
Figure 13:
Figure 13:
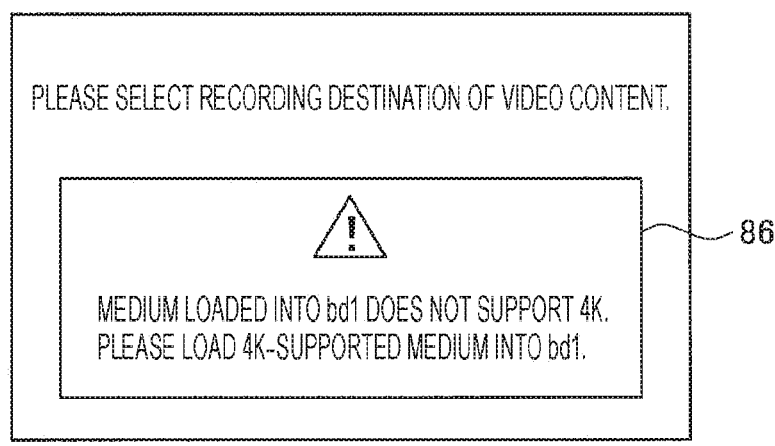

FIG. 13 is an explanatory drawing illustrating a further modified example of the recording-medium selection screen. The same selection screen as that shown in the upper part of FIG. 12 is shown in the upper part of FIG. 13. Here, in a case where the selection button 81 indicating the BD drive 380 that does not support a high image quality function is selected by the user, BD8K is described in allowedTypes in detailed information of a recording medium, and a recordable medium is not loaded, as shown in the lower part of FIG. 13, the control unit 240 may display, on the selection screen, a message 86 prompting the user to load a medium that supports high-image-quality video content. Such a configuration enables the user to understand the necessity to load a medium, and to use a loaded medium as a recording destination.

7. SELECTION OF VIDEO CONTENT

The operation of selecting a recording medium has been described above. Subsequently, operation of selecting video content will be described.

On the basis of program listing information included in a broadcast wave, the control unit 240 generates a program listing screen including titles of a plurality of video contents, and causes the display device to display the program listing screen. The user selects desired video content from the program listing screen.

8. UPLOADING OF VIDEO CONTENT

The operation of selecting video content has been described above. Subsequently, operation of uploading video content will be described.

Figure 14:
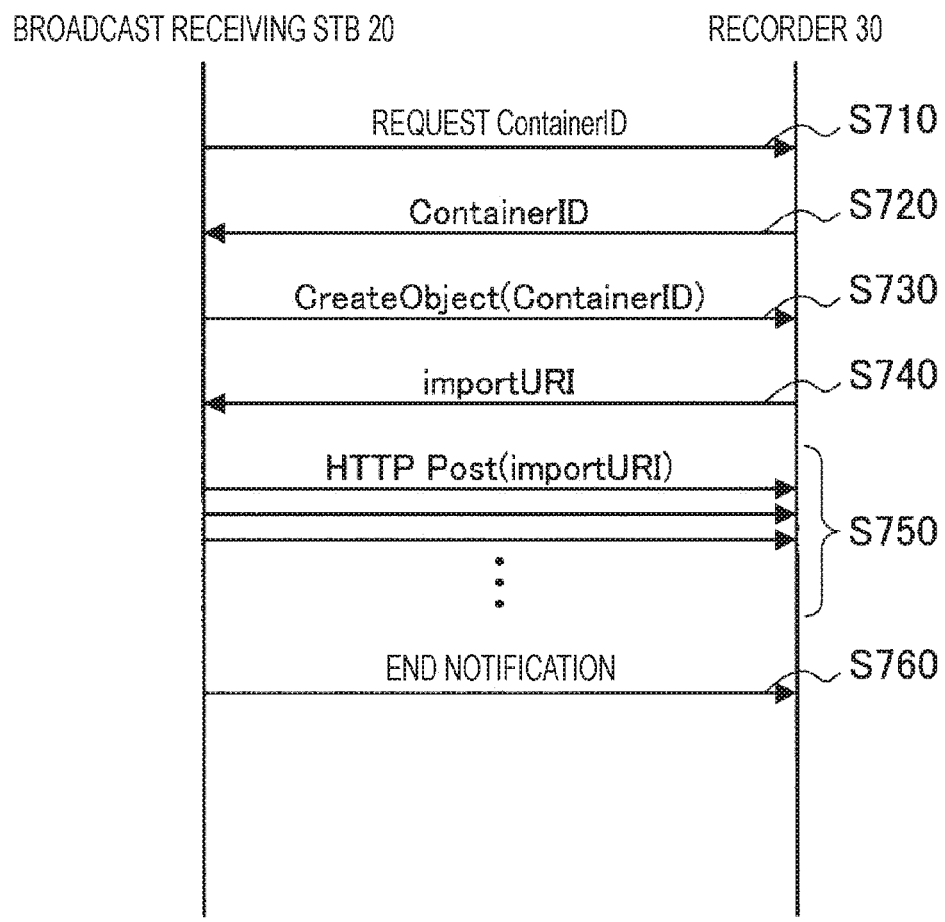
FIG. 14 is an explanatory drawing illustrating detailed operation of uploading video content.

FIG. 14 is an explanatory drawing illustrating detailed operation of uploading video content. As shown in FIG. 14, the broadcast receiving STB 20 transmits, to the recorder 30, a request for ContainerID that is information for designating a recording destination selected by a user (S710). A specific example of ContainerID is as shown below. An underlined part shown below indicates that a recording-destination recording medium is "hdd1."

```
POST /upnp/control/ContentDirectory HTTP/1.1
Host:192.168.2.2:64321User-Agent:UPnP/1.0
DLNADOC/1.50
Content-Length:1311
Content-Type:text/xml; charset="utf-8"
SOAPACTION:"urn:schemas-upnp-
```

```
org:service:ContentDirectory:1#X_HDLnkGetRecord
ContainerID"
<?xml version="1.0"?>
<s:Envelope
xmlns:s="http://schemas.xmlsoap.org/soap/envelope/"s:encodingSty
le
="http://schemas.xmlsoap.org/soap/encoding/">
    <s:Body>
        <u:X_HDLnkGetRecordContainerID xmlns:u="urn:schemas-upnp-
org:service
:ContentDirectory:1">
            <RecordDestinationID>hdd1</RecordDestinationID>
            <Element><?xml version="1.0"?>
<DIDL-Lite
xmlns:dc="http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:dlna="urn:schemas-dlna-org:metadata-1-0/"
xmlns:arib="urn:schemas-arib-or-jp:elements-1-0/">
<item id="" parentID="VIDEO"
restricted="0"><dc:title>ahoaho</dc:title&
gt;<upnp:class>object.item.videoItem</upnp:class><
;upnp:genre>genre</upnp:genre><res
protocolInfo="*:*:application/x-
dtcp1;DTCP1HOST=00.00.00.00;DTCP1PORT=0000;CONTENTFORMAT=video/v
nd.hdlnk.mpeg-tts:DLNA.ORG_PN=MPEG_TS_SD_EU_T"
size="257247732"
dlna:cleartextSize="257244288"
bitrate="506095"
duration="119000"></res></item></DID
L-Lite>
            </Element>
        </u:X_HDLnkGetRecordContainerID>
    </s:Body>
</s:Envelope>
```

Subsequently, the recorder 30 transmits ContainerID to the broadcast receiving STB 20. A specific example of ContainerID is as shown below. An underlined part shown below indicates that ContainerID is "VIDEO."

```
<?xml
version="1.0"?>
    <s:Envelope
xmlns:s="http://schemas.xmlsoap.org/soap/envelope/"s:encoding
Style="http://schemas.xmlsoap.org/soap/encoding/">
    <s:Body>
        <u:X_HDLnkGetRecordContainerIDResponse
            xmlns:u="urn:schemas-
upnp-org:service:ContentDirectory:1">
            <ContainerID>VIDEO</ContainerID>
        </u:X_HDLnkGetRecordContainerIDResponse>
```

-continued

```
    </s:Body>
</s:Envelope>
```

After that, the broadcast receiving STB 20 transmits CreateObject (ContainerID) to the recorder 30 by using ContainerID (S730). A specific example of CreateObject (ContainerID) is as shown below. In the following example, "VIDEO" is designated as ContainerID. It should be noted that in a case where a recording destination is assigned to the recorder 30, "AnyContainer" is designated. In addition, "res protocolInfo" represents information indicating details of video content, for example, the information indicating that a medium profile of video content is HEVC_TS_4K_SDR_M2AAC.

```
POST/DMSContentDirectory HTTP/1.1
X-AV-Physical-Unit-Info:pa="DST-HD1";pl=RFNULUhEMQ==;
X-AV-Client-Info:av=5.0;cn="Sony Corporation";mn="DST-
HD1";mv="1.0";
Host:192.168.16.210:64220
User-Agent:UPnP/1.0
DLNADOC/1.50
Content-Length:1717
Content-Type:text/xml;charset="utf-8"
X-PARENTALLOCK:
SOAPACTION
"urn:schemas-upnp-org:service:ContentDirectory:1#CreateObject"
<?xml version="1.0" encoding="UTF-8"?>
<s:Envelope
xmlns:s="http://schemas.xmlsoap.org/soap/envelope/"s:encodingSty
le
="http://schemas.xmlsoap.org/soap/encoding/"><s:Body>
<u:CreateObject xmlns:u="urn:schemas-upnp-
org:service:ContentDirectory:1">
<ContainerID>VIDEO</ContainerIDXElements>
```

```
<DIDL-Lite xmlns:dc="http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:dlna="urn:schemas-dlna-org:metadata-1-0/"
xmlns:arib="urn:schemas-arib-or-jp:elements-1-0/"
xmlns:dtcp="urn:schemas-dtcp-com:metadata-1-0/"
xmlns:sptv="urn:schemas-skyperfectv-co-jp:elements-1-0/"
xmlns:xsrs="urn:schemas-xsrs-org:metadata-1-0/x-srs/">
<item id="" parentID="DLNA.ORG_AnyContainer" restricted="0">
<dc:title>.............................................#1....
..</dc:title>
<arib:objectType>SPTV_CS</arib:objectType>
<upnp:class>object.item.videoItem</upnp:class>
<upnp:genre>...............</upnp:genre>
<upnp:channelName>.....................X(AT-
X)</upnp:channelName>
<upnp:channelNr>729</upnp:channelNr>
<dc:date>2009-10-20T13:59:21</dc:date>
<xsrs:reservationID>0x0000000000000155</xsrs:reservationID>
<res protocolInfo="http-get:*:video/vnd.dlna.mpeg-
tts:XXXX.XXX_PN=HEVC_TS_4K_SDR_M2AAC;DLNA.ORG_OP
=10;DLNA.ORG_CI=1;DLNA.ORG_FLAGS=01100000000000000000000000000
0"></res>
</item>
</DIDL-Lite>
</Elements>
</u:CreateObject>
</s:Body>
</s:Envelope>
```

Subsequently, the recorder 30 transmits information including importURI to the broadcast receiving STB 20 (S740). A specific example of the information including importURI is as shown below. In the following example, an underlined part corresponds to importURI.

```
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
   <u:CreateObjectResponse xmlns:u="urn:schemas-upnp-
org:service:ContentDirectory:1">
    <ObjectID>UL_1</ObjectID>
    <Result>
    <DIDL-Lite xmlns:dc="http://purl.org/de/elements/1.1/"
xmlns="urn:schemas-upnp-org:metadata-1-0/DIDL-Lite/"
xmlns:upnp="urn:schemas-upnp-org:metadata-1-0/upnp/"
xmlns:dlna="urn:schemas-dlna-org:metadata-1-0/" xmlns:arib
="urn:schemas-arib-or-jp:elements-1 - 0/"
xmlns:dtcp="urn:schemas-dtcp-com:metadata-1-0/"
xmlns:sptv="urn:schemas-skyperfectv-co-jp:elements-1-0/"
xmlns:xsrs="urn:schemas-xsrs-org:metadata-1-0/x-srs/">
    <item id="UL_1" parentID="AllUploads" restricted="0"
dlna:dlnaManaged
="00000004">
    <dc:title>...........................................
#1......</dc:title>
    <arib:objectType>SPTV_CS</arib:objectType>
    <upnp:genre>...............</upnp:genre>
    <upnp:channelName>.....................X(AT-
X)</upnp:channelName>
    <upnp:channelNr>729</upnp:channelNr>
    <res protocolInfo=" http-get:*:video/vnd.dlna.mpeg-
tts:XXXX.XXX _PN
=HEVC_TS_4K_SDR_M2AAC;DLNA.ORG_OP=10;DLNA.ORG_CI=1;DLNA.ORG_FLAG
S=01100000000000000000000000000000""importUri="http://192.168.16
.210:60151/UpObjID=UL_1"></res>
    <upnp:class>object.item.videoItem.movie</upnp:class>
    </item>
      /DIDL-Lite>
    </Result>
   </u:CreateObjectResponse>
</s:Body>
</s:Envelope>
```

After that, the broadcast receiving STB 20 uses importURI to upload video content by HTTP POST (S750), and when chunkSize becomes "0," the broadcast receiving STB 20 transmits an end notification to the recorder 30 (S760).

9. EFFECTS

According to the embodiments of the present disclosure described above, various kinds of effects are obtained.

For example, the broadcast receiving STB 20 determines whether or not each apparatus in a network has a high image quality function, and is capable of generating an apparatus selection screen on the basis of a result of the determination. Accordingly, the user is enabled to select a transmission destination of high-image-quality video content as appropriate, and the broadcast receiving STB 20 is enabled to transmit the high-image-quality video content to the transmission destination.

In addition, the broadcast receiving STB 20 determines whether or not each recording medium included in the transmission destination apparatus has a high image quality function, and is capable of generating a recording-medium selection screen on the basis of a result of the determination. Accordingly, the user is enabled to select a recording destination of high-image-quality video content as appropriate, and to realize recording of the high-image-quality video content to the recording destination.

As a result of the above, device-bound video content recorded on a HDD connected to a TV can be moved to another apparatus, and therefore, even if the HDD connected to the TV has reached full capacity, the video content recorded on the HDD can be written to a medium such as a BD.

10. MODIFIED EXAMPLES

The embodiment of the present disclosure has been described above. Some modified examples of the embodiment of the present disclosure will be described below. It should be noted that each modified example described below may be independently applied to the embodiment of the present disclosure, or may be applied to the embodiment of the present disclosure in combination. In addition, each modified example may be applied as an alternative to the configuration described in the embodiment of the present disclosure, or may be additionally applied to the configuration described in the embodiment of the present disclosure.

First Modified Example

The example in which the broadcast receiving STB 20 transmits video content in order to record the video content has been described above. However, the broadcast receiving STB 20 may transmit video content to another apparatus in order to display the video content. In this case, the operation of selecting a recording medium, which has been described with reference to FIG. 4 and the like, is omitted.

Second Modified Example

The example in which an apparatus is selected on the apparatus selection screen has been described above. However, it is not always required to generate the apparatus selection screen. For example, in a case where only one apparatus exists in the network, and in a case where there exists only one apparatus having a function that supports video content to be transmitted, the broadcast receiving STB 20 may determine the apparatus to be a transmission destination without being selected by user's operation. In addition, even in a case where a plurality of apparatuses exists, the broadcast receiving STB 20 may automatically select any of the apparatuses at random, or according to a user's selection history in the past, a use situation of each apparatus, or the like.

Similarly, the example in which a recording medium is selected on the recording-medium selection screen has been described above. However, it is not always required to generate the recording-medium selection screen. For example, in a case where an apparatus that is a transmission destination of video content has only one recording medium or has only one recording medium that supports video content to be transmitted, the broadcast receiving STB 20 may determine the recording medium to be a recording destination without being selected by user's operation. In addition, even in a case where a plurality of recording media exists, the broadcast receiving STB 20 may automatically select any of the recording media at random, or according to a user's selection history in the past, a use situation of each recording medium, or the like.

(Others)

It should be noted that although the preferable embodiments of the present disclosure have been described in detail with reference to the accompanying drawings, the technical scope of the present disclosure is not limited to such examples. It is clear that those who have ordinary skills in the technical field of the present disclosure can conceive of various correction examples or modification examples within the category of the technical idea set forth in the claims. It should be understood that, as a matter of course, these examples also belong to the technical scope of the present disclosure.

For example, it is not always necessary to time-sequentially process each step in the processing of the broadcast receiving STB 20, and each step in the processing of the recorder 30, according to the order described in the sequence diagram or the flowchart. For example, each step in the processing of the broadcast receiving STB 20, and each step in the processing of the recorder 30, may be processed in the order different from the order described in the flowchart, or may be processed in a parallel manner.

In addition, it is also possible to create a computer program that causes hardware including a CPU, a ROM, a RAM, and the like, which are built into the broadcast receiving STB 20 and the recorder 30, to carry out functions equivalent to those of respective configurations of the broadcast receiving STB 20 and the recorder 30 described above. Moreover, a storage medium having the computer program recorded thereon is also provided.

Furthermore, the effects described in the present description are to be construed as merely descriptive or illustrative, and are not limitative. In other words, the technology according to the present disclosure can achieve, along with or instead of the above effects, other effects apparent to a person skilled in the art from the statement of the present description.

In addition, the following configurations also belong to the technical scope of the present disclosure.

(1)

A video communication device including:

a communication unit that receives, from one or more video processing devices, device information of each of the one or more video processing devices; and a determination unit that determines, on the basis of one or more pieces of device information received by the communication unit, whether or not each of the one or more video processing devices has a high image quality function, the high image quality function being a function that supports any of high image qualities of 4K or more, in which the communication unit transmits video content having the high image quality to a video processing device that has been determined by the determination unit to have the high image quality function.

(2)

The video communication device set forth in the preceding (1), further including a display control unit that, on the basis of a result of the determination made by the determination unit, generates a selection screen for selecting a video processing device that is a transmission destination of video content, in which the communication unit transmits the high-image-quality video content to a video processing device that has been selected on the video-processing-device selection screen.

(3)

The video communication device set forth in the preceding (2), in which the video-processing-device selection screen includes displaying each of the one or more video processing devices, and displaying whether or not each of the one or more video processing devices has the high image quality function.

(4)

The video communication device set forth in the preceding (2), in which in a case where an image quality of the video content is the high image quality, among the one or more video processing devices, a video processing device that has the high image quality function is selectably displayed, and a video processing device that does not have the high image quality function is not selectably displayed, on the video-processing-device selection screen.

(5)

The video communication device set forth in the preceding (2), in which:

the video-processing-device selection screen includes displaying each of the one or more video processing devices; and in a case where an image quality of the video content is the high image quality, and a video processing device that does not have the high image quality function has been selected on the video-processing-device selection screen, the display control unit displays, on the video-processing-device selection screen, a message indicating that the video processing device is not capable of handling processing of the video content.

(6)

The video communication device set forth in any one of the preceding (1) to (5), in which the communication unit receives, as the device information, device description that is obtained by designating an URL included in response information indicating a response to M-Search defined in UPnP, and a list of functions supported by the video processing device obtained by GetProtocolInfo.

(7)

The video communication device set forth in the preceding (6), in which the device description includes a device profile to which a plurality of medium profiles belongs.

(8)

The video communication device set forth in any one of the preceding (2) to (5), in which:

the communication unit receives, from a video processing device that has been selected on the video-processing-device selection screen, medium information related to a recording medium that is a recording destination of recording by the video processing device;

the determination unit determines, on the basis of the medium information, whether or not the high-image-quality video content can be recorded on the recording medium; and on the basis of a result of the determination made by the determination unit, the display control unit generates a selection screen for selecting a recording medium that is a recording destination of the video content.

(9)

The video communication device set forth in the preceding (8), in which the recording-medium selection screen includes displaying each of one or more recording media, and displaying whether or not the high-image-quality video content can be recorded on each of the one or more recording media.

(10)

The video communication device set forth in the preceding (8), in which in a case where an image quality of the video content is the high image quality, a recording medium that supports the high-image-quality video content is selectably displayed, and a recording medium that does not support the high-image-quality video content is not selectably displayed, on the recording-medium selection screen.

(11)

The video communication device set forth in the preceding (8), in which:

the recording-medium selection screen includes displaying each of the one or more recording media; and in a case where an image quality of the video content is the high image quality, and a recording medium that does not support the high-image-quality video content has been selected on the recording-medium selection screen, the display control unit displays, on the recording-medium selection screen, a message indicating that the video content cannot be recorded on the recording medium.

(12)

The video communication device set forth in any one of the preceding (8) to (11), in which the communication unit transmits, to a video processing device that has been selected on the video-processing-device selection screen, information designating a recording medium that has been selected on the recording-medium selection screen, and information indicating a medium profile of the video content.

(13)

A video communication method including:

receiving, from one or more video processing devices, device information of each of the one or more video processing devices;

on the basis of one or more pieces of received device information, determining, by a processor, whether or not each of the one or more video processing devices has a high image quality function, the high image quality function being a function that supports any of high image qualities of 4K or more; and transmitting video content having the high image quality to a video processing device that has been determined to have the high image quality function.

(14)

A video processing device including:

a video processing unit having a high image quality function that supports any of high image qualities of 4K or more; and a communication unit that, according to a request from a video communication device, transmits, to the video communication device, device information including information indicating the high image quality function possessed by the video processing unit, and receives video content having the high image quality from the video communication device.

(15)

An information processing method including:

receiving a request for device information from a video communication device;

controlling, by a processor, transmission of the device information to the video communication device, the device information including information indicating a high image quality function that supports any of high image qualities of 4K or more; and receiving video content having the high image quality from the video communication device.

REFERENCE SIGNS LIST

20 Broadcast receiving STB
30 Recorder
40 Device
50 DHCP router
220 Broadcast receiving unit
230 Operation unit
240 Control unit
250 Storage unit
260 Communication unit
340 Control unit
360 Communication unit
370 HDD
380 BD drive

The invention claimed is:

1. A video communication device, comprising:
a central processing unit (CPU) configured to:
control reception, from at least one video processing device, of device information of each of the at least one video processing device;
determine, based on the received device information, an availability of a high image quality function for each of the at least one video processing device, wherein the high image quality function supports high image quality of 4K or more than 4K;
generate, based on a result of the determination of the availability of the high image quality function, a video-processing-device selection screen for selection of a first video processing device of the at least one video processing device, wherein the first video processing device has the high image quality function;
control reception, from the selected first video processing device, of medium information related to a first recording medium of at least one recording medium that is a recording destination of recording by the first video processing device;
determine, based on the medium information, recordability of video content of the high image quality on the first recording medium;
generate, based on the video content of the high image quality is recordable on the first recording medium, a selection screen for selection of the first recording medium that is the recording destination of recording of the video content; and
control transmission, to the first video processing device, of the video content and information that designates the selected first recording medium.

2. The video communication device according to claim 1, wherein the generated video-processing-device selection screen includes display of each of the at least one video processing device, and display of the availability of the high image quality function for each of the at least one video processing device.

3. The video communication device according to claim 1, wherein based on the high image quality of the video content, the video-processing-device selection screen includes display of the first video processing device that has the high image quality function, and the video-processing-device selection screen excludes display of a second video processing device of the at least one video processing device that does not have the high image quality function.

4. The video communication device according to claim 1, wherein
the video-processing-device selection screen includes display of each of the at least one video processing device, and
based on an image quality of the video content is the high image quality and a selection of a second video processing device of the at least one video processing device that does not have the high image quality function on the video-processing-device selection screen, the CPU is further configured to control display, on the video-processing-device selection screen, of a message that indicates that the second video processing device is not capable to handle processing of the video content.

5. The video communication device according to claim 1, wherein
the CPU is further configured to control reception of device description and a list of functions supported by the first video processing device,
the device description is obtained by designation of a URL included in response information that indicates a response to M-Search defined in UPnP,
the list of functions supported by the first video processing device is obtained by GetProtocolInfo, and
the device description is received as the device information.

6. The video communication device according to claim 5, wherein the device description includes a device profile and a plurality of medium profiles associated with the device profile.

7. The video communication device according to claim 1, wherein the generated selection screen includes display of each of the at least one recording medium, and display of the recordability of the video content of the high image quality on each of the at least one recording medium.

8. The video communication device according to claim 1, wherein based on an image quality of the video content is the high image quality, the selection screen displays the first recording medium that supports the video content of the high image quality, and the selection screen excludes display of a second recording medium of the at least one recording medium that does not support the video content of the high image quality.

9. The video communication device according to claim 1, wherein
the selection screen includes display of each of the at least one recording medium; and
based on an image quality of the video content is the high image quality, and a selection of a second recording medium of the at least one recording medium that does not support the video content of the high image quality on the selection screen, the CPU is further configured to control display, on the selection screen, of a message that indicates that the video content is not recordable on the second recording medium.

10. The video communication device according to claim 1, wherein the CPU is further configured to transmit, to the selected first video processing device, information that designates the selected first recording medium, and information indicating a medium profile of the video content.

11. A video communication method, comprising:
controlling reception, from at least one video processing device, of device information of each of the at least one video processing device;
determining, by a processor, based on the received device information, an availability of a high image quality function for each of the at least one video processing device, wherein
the high image quality function supports image quality of 4K or more than 4K;
generating, based on a result of the determination of the availability of the high image quality function, a video-processing-device selection screen for selection of a video processing device of the at least one video processing device, wherein the video processing device has the high image quality function;
controlling reception, from the selected video processing device, of medium information related to a recording medium that is a recording destination of recording by the video processing device;
determining, based on the medium information, recordability of video content of the high image quality on the recording medium;
generating, based on the video content of the high image quality is recordable on the recording medium, a selection screen for selection of the recording medium that is the recording destination of recording of the video content; and
controlling transmission of the video content and information that designates the selected recording medium to the video processing device.

12. A video processing device, comprising:
a central processing unit (CPU) configured to:
control reception of a request for device information from a video communication device;
control transmission, to the video communication device, of the device information that includes information that indicates that the video processing device has a high image quality function that supports one of high image quality of 4K or more than 4K;
control transmission, to the video communication device, of medium information related to a recording medium that is a recording destination of recording video content of high image quality, wherein
the video communication device generates, based on the medium information that indicates that the video content of the high image quality is recordable on the recording medium, a selection screen for selection of the recording medium; and
control reception, from the video communication device, of the video content that has the high image quality and information that designates the selected recoding medium.

13. An information processing method, comprising:
in a video processing device:
controlling, by a processor of the video processing device, reception of a request for device information from a video communication device;
controlling, by the processor, transmission of the device information to the video communication device, wherein the device information includes information that indicates that the video processing device has a high image quality function that supports image quality of 4K or more than 4K;
controlling transmission, to the video communication device, of medium information related to a recording medium that is a recording destination of recording video content of the high image quality,
wherein the video communication device generates, based on the medium information that indicates that the video content of the high image quality is recordable on the recording medium, a selection screen for selection of the recording medium; and
controlling reception, from the video communication device, of the video content that has the high image quality and information that designates the selected recoding medium.

* * * * *